(12) United States Patent
Fukutani et al.

(10) Patent No.: US 6,488,749 B1
(45) Date of Patent: Dec. 3, 2002

(54) RUST PREVENTIVE

(75) Inventors: Yasuo Fukutani, 252-7 Iba, Notogawa-Cho, Kanzaki-Gun, Shiga (JP), 521-1235; Kikuko Fukutani, Shiga (JP); Yukio Wada, Hikone (JP); Yoshiki Ueno, Osaka (JP); Shinya Fukushima, Shiga (JP); Eiichiro Nakayama, Hikone (JP)

(73) Assignee: Yasuo Fukutani, Shiga (JP)

( * ) Notice: Subject to any disclaimer, the term of this patent is extended or adjusted under 35 U.S.C. 154(b) by 0 days.

(21) Appl. No.: 09/869,965

(22) PCT Filed: Nov. 10, 2000

(86) PCT No.: PCT/JP00/07985

§ 371 (c)(1), (2), (4) Date: Jul. 10, 2001

(87) PCT Pub. No.: WO01/36714

PCT Pub. Date: May 25, 2001

(30) Foreign Application Priority Data

Nov. 12, 1999 (JP) ............................................ 11-323140

(51) Int. Cl.$^7$ ................................................. C23F 11/14
(52) U.S. Cl. ................................. 106/14.42; 106/14.13; 106/14.15; 106/14.16; 106/14.44; 252/389.1; 252/389.3; 252/394

(58) Field of Search ........................... 106/14.44, 14.42, 106/14.15, 14.16, 14.13; 252/389.1, 389.3, 394

(56) References Cited

U.S. PATENT DOCUMENTS

| | | | | |
|---|---|---|---|---|
| 4,406,811 A | * | 9/1983 | Christensen et al. | 252/180 |
| 4,902,443 A | * | 2/1990 | Penninger et al. | 252/388 |
| 5,269,956 A | * | 12/1993 | Miller et al. | 252/67 |
| 5,958,850 A | * | 9/1999 | Matsuzaki et al. | 106/14.12 |
| 6,080,331 A | * | 6/2000 | Meszaros et al. | 252/79 |

FOREIGN PATENT DOCUMENTS

| | | | |
|---|---|---|---|
| EP | 643154 | * | 3/1995 |
| EP | 816467 | * | 1/1998 |
| GB | 2049650 | * | 12/1980 |
| JP | 10-46134 | * | 2/1998 |

* cited by examiner

*Primary Examiner*—Anthony J. Green

(57) ABSTRACT

An object of the present invention is to provide an aquarous rust inhibitor having low toxicity and excellent rust resistance, which contains saturated fatty acid, saturated dicarboxylic acid and salt thereof, derivatives of ethylene-diamine tetraacetic acid, tolyltriazole or benzotriazole, fatty acid metal salt, and water.

8 Claims, No Drawings

RUST PREVENTIVE

FIELD OF THE INVENTION

The present invention relates to a rust inhibitor for metal. More particularly, the invention relates to a metal working fluid or water soluble rust inhibitor, which can be used for storing metallic parts.

BACKGROUND OF THE INVENTION

A cutting fluid or lubricant is used for cutting metals such as an iron, aluminum, and various types of alloys. Such cutting fluid and lubricant is a water insoluble cutting oil, water soluble cutting oil, or water soluble composition developed by the inventors of the present invention. Generally, a rust inhibitor is added to these cutting fluids and lubricants to protect metal from corrosion.

The rust inhibitor can be used for various purposes. For example, it can also be used with a cooling fluid for radiators.

However, a conventional rust inhibitor has drawbacks of having toxicity and inferior rust resistance.

Accordingly, an object of the present invention is to provide a rust inhibitor having low toxicity so as not to adversely affect the environment.

Another object of the present invention is to provide a rust-inhibiting composition having high rust resistance.

DISCLOSURE OF THE INVENTION

As the result of our researches on the development of an environment-friendly rust inhibitor having high rust resistance, we have eventually found the present invention.

The rust inhibitor of the present invention is an aqueous solution containing saturated fatty acid, saturated dicarboxylic acid and salt thereof, chelating agent, tolyltriazole or benzotriazole, and fatty acid metal salt.

The rust inhibitor of the present invention may further contain hydroxide and/or methasilicate such as sodium methasilicate.

The rust inhibitor of the present invention may be an aqueous solution containing 0.1 to 5 wt % of saturated fatty acid, 0.01 to 1 wt % of saturated dicarboxylic acid and salt thereof, 0.01 to 1 wt % of chelating agent, $5 \times 10^{-3}$ wt % to 1 wt % of tolyltriazole or benzotriazole, and 0.01 to 1 wt % of fatty acid metal salt.

The saturated fatty acid can be at least one selected from the group consisting of caprylic acid, caproic acid, decanoic acid, lauric acid, myristic acid, palmitic acid, and stearic acid.

The saturated dicarboxylic acid can be dodecanoic diacid or sebacic acid.

The chelating agent can be a derivative of ethylenediamine tetraacetic acid or a derivative of nitrilotriacetic acid.

The hydroxide can be potassium hydroxide. The concentration of the hydroxide can be in a range of 0.1 to 5 wt %.

The fatty acid metal salt can be fatty acid potassium salt.

DESCRIPTION OF THE PREFERRED EMBODIMENTS

A rust inhibitor of the present invention is an aqueous solution prepared by dissolving at least saturated fatty acid, saturated dicarboxylic acid and salt thereof, chelating agent, tolyltriazole or benzotriazole, and fatty acid metal salt in distilled water, deionized water, tap water or the like.

The rust inhibitor of the present invention can be prepared by further adding hydroxide and/or methasilicate.

Although the amounts of saturated fatty acid, saturated dicarboxylic acid and salt thereof, chelating agent, tolyltriazole or benzotriazole, and fatty acid metal salt are not particularly limited, the rust inhibitor of the present invention is an aqueous solution containing 0.1 to 5 wt % of saturated fatty acid, preferably 0.3 to 1 wt %; 0.01 to 1 wt % of saturated dicarboxylic acid and salt thereof, preferably 0.03 to 0.1 wt %; 0.01 to 1 wt % of chelating agent such as a derivative of ethylenediamine triacetic acid, preferably 0.02 to 0.1 wt %; $5 \times 10^{-3}$ to 1 wt % of tolyltriazole or benzotriazole, preferably 0.01 to 0.1 wt %; and 0.01 to 0.1 wt % of fatty acid metal salt, preferably 0.02 to 0.1 wt %.

The saturated fatty acid contained in the rust inhibitor of the present invention is not particularly limited, but any saturated fatty acid known to persons skilled in the art can be used. Preferable saturated fatty acid is at least one selected form the group consisting of caprylic acid, caproic acid, decanoic acid, lauric acid, myristic acid, palmitic acid, and stearic acid.

The saturated dicarboxylic acid contained in the rust inhibitor of the present invention is not particularly limited, but any saturated dicarboxylic acid known to persons skilled in the art can be used. Preferable saturated dicarboxylic acid is dodecanoic diacid or sebacic acid.

The chelating agent contained in the rust inhibitor of the present invention is not particularly limited, but any chelating agent known to persons skilled in the art can be used. Examples of the chelating agent include a derivative of ethylenediamine tetraacetic acid or nitrilotriacetic acid. Preferable chelating agent can be ethylenediamine tetraacetate tetrasodium salt (EDTA-4Na4H$_2$O) complex or the like.

The fatty acid metal salt contained in the rust inhibitor of the present invention is not particularly limited, but any fatty acid metal salt known to persons skilled in the art can be used. Examples of preferable fatty acid metal salt include fatty acid potassium salt, fatty acid sodium salt, and the like.

The aqueous solution prepared from saturated fatty acid, saturated dicarboxylic acid and salt thereof, chelating agent such as a derivative of ethylenediamine tetraacetic acid, tolyltriazole or benzotriazole, fatty acid metal salt can be used for various purposes as a substitute of a conventional rust inhibitor. However, in order to increase a rust resistance, the solution preferably further contains hydroxide or methasilicate as a pH adjuster. The hydroxide used herein is not particularly limited, but any hydroxide known to persons skilled in the art can be used. Examples of hydroxide include sodium hydroxide, potassium hydroxide, calcium hydroxide, and the like. The methasilicate used herein is also not particularly limited, but any methasilicate known to persons skilled in the art, such as sodium methasilicate, can be used.

In addition, the rust inhibitor of the present invention may further contain stabilizer and the like.

The rust inhibitor of the present invention can effectively protect various metals as iron, cupper, stainless steel, and aluminum from rust, so that it can be added to a metal cutting fluid to be used in metal cutting operation or can be used as an anticorrosive dye. In addition, the rust inhibitor of the present invention can be used as circulating water for radiator or air conditioner of a motor vehicle, or circulating fluid for floor heating.

The rust inhibitor of the present invention has lower toxicity than conventional rust inhibitors containing chrome and amine. Furthermore, the rust inhibitor of the present invention has high compatibility with a metal working fluid developed by the inventors of the present invention, and protects the metal from rust.

The rust inhibitor of the present invention will be more clearly understood by referring to the Examples below. However, the Examples should not be construed to limit the invention in any way. It will be apparent to those skilled in the art that various improvements, changes, and modifications can be made thereto without departing from the spirit or scope of the present invention.

EXAMPLES

Next, a method for producing a rust inhibitor of the present invention and a rust resistance test using the same will be described below.

Example 1

(28) 270 g of potassium hydroxide (available from Asahi Glass Company), 180 g of caprylic acid (available from NOF Corporation), 20 g of EDTA-4Na.4H$_2$O (available from Teikoku Chemical Industries Co., Ltd. under the trade name "Crewat S2"), 30 g of dodecanoic diacid (available from Okamura Oil Co., Ltd., Osaka), and g of tolyltriazole (available from Johoku Chemical Co.,Ltd.), and 14 g of fatty acid potassium were added to 440 g of distilled water to prepare a concentrated mixture. This concentrated solution was diluted 50 times with distilled water, and thus a rust inhibitor of the present invention was prepared.

Example 2

The rust inhibitor (sample number #1) and a commercially-available rust inhibitor (sample number #3) diluted 50 times were subjected to a semi-immersion acceleration test to observe the formation of rust. Each sample sheet of cast iron, cupper alloy, and aluminum alloy (25 mm×50 mm×3.0 to 0.8 mm) was placed in a glass bottle in such a manner that a half of each sheet was soaked in the rust inhibitor prepared in Example 1 or the dilute solution of commercially-available rust inhibitor. After that, the bottle was covered with a lid and set on its side, so that the respective sheets were completely soaked in the solution. The bottle was left for a minute, and then put into a thermostat at 50° C. In this condition, the surfaces (liquid phase part, interface part, gaseous phase part) of the respective sample sheets were observed after 24, 48, 72, and 138 hours to determine the amount of rust formed thereon. Results of the observation are shown in Tables 1 and 2.

TABLE 1

| Sample number | material | Observed part | 24 Hr | 48 Hr | 72 Hr | 138 Hr | Note |
|---|---|---|---|---|---|---|---|
| #1 | FC-200 (cast iron) | gaseous phase | 0 | 0 | 0 | 0 | |
| | | interface | 0 | 0 | 0 | 0 | |
| | | liquid phase | 0 | 0 | 0 | 0 | |
| | BS (Brass casting) | gaseous phase | 0 | 1 | 2 | 3 | |
| | | interface | 0 | 0 | 0 | 1 | |
| | | liquid phase | 0 | 0 | 0 | 0 | |
| | BC (bronze casting) | gaseous phase | 0 | 1 | 2 | 2 | |
| | | interface | 0 | 0 | 0 | 0 | |
| | | liquid phase | 0 | 0 | 0 | 0 | |
| | ADC-12 (aluminum die-cast alloy) | gaseous phase | 1 | 2 | 2 | 2 | |
| | | interface | 1 | 3 | 4 | 4 | |
| | | liquid phase | 1 | 3 | 4 | 5 | |
| | A-52 (corrosion resisting aluminum alloy) | gaseous phase | 1 | 2 | 2 | 2 | |
| | | interface | 1 | 2 | 3 | 4 | |
| | | liquid phase | 0 | 0 | 0 | 1 | |

TABLE 2

| Sample number | material | Observed part | 24 Hr | 48 Hr | 72 Hr | 138 Hr | Note |
|---|---|---|---|---|---|---|---|
| #3 | FC-200 (cast iron) | gaseous phase | 1 | 2 | 2 | 4 | |
| | | interface | 0 | 0 | 0 | 0 | |
| | | liquid phase | 0 | 0 | 0 | 0 | |
| | BS (Brass casting) | gaseous phase | 1 | 1 | 2 | 4 | |
| | | interface | 1 | 2 | 3 | 3 | |
| | | liquid phase | 0 | 0 | 0 | 0 | |
| | BC (bronze casting) | gaseous phase | 0 | 1 | 2 | 2 | |
| | | interface | 1 | 1 | 2 | 2 | |
| | | liquid phase | 0 | 0 | 0 | 0 | |
| | ADC-12 (aluminum die-cast alloy) | gaseous phase | 0 | 0 | 1 | 1 | |
| | | interface | 1 | 1 | 1 | 2 | |
| | | liquid phase | 1 | 1 | 2 | 2 | |
| | A-52 (corrosion resisting aluminum alloy) | gaseous phase | 1 | 1 | 1 | 2 | |
| | | interface | 0 | 0 | 0 | 1 | |
| | | liquid phase | 0 | 0 | 0 | 0 | |

In the Tables, a numeral 0 indicates that no rust was formed, a numeral 1 indicates that rust was formed on less than 10% of a sample sheet, a numeral 2 indicates that rust was formed on 10 to 40% of the sample sheet, a numeral 3 indicates that rust is formed on 40 to 70% of the sample sheet, a numeral 4 indicates that rust was formed on 70 to 90% of the sample sheet, and a numeral 5 indicates that rust was formed on 90% or more of the sample sheet.

The Table 1 shows that no rust was formed on the cast iron FC-200 even after 138 hours when it was soaked in the rust inhibitor prepared in Example 1.

On the other hand, when the cast iron FC-200 was soaked in the commercially-available rust inhibitor, rust was formed on the 10% of the cast iron after 24 hours, and on 30% of the cast iron after 138 hours.

Although slight rusting and discoloring appeared on the metal sheets other than cast iron when they were soaked in the rust inhibitor of the present invention, the inhibitor of the present invention could prevent the formation of rust at least as sufficiently as the commercially-available rust inhibitor.

When the amount of dilution of the concentrated solution prepared in Example 1 was lower, the formation of rust could be further prevented on any sample sheets.

Example 3

The rust inhibitor of the present invention was tested to determine water resistance. The concentrated solution of the rust inhibitor prepared in Example 1 was applied to sample pieces of newspaper (200 mm×275 mm) and filter paper (5C, 110 mm) with a brush, and was dried by means of a drier. A drop of tap water was then put onto the surface of these sample pieces to find the time required for the water to be completely absorbed by the paper samples. Water absorbance was visually observed. Results of the observations are shown in Table 3.

TABLE 3

| | Time required for water to be completely absorbed |
|---|---|
| Newspaper blank A (not printed) | 2 minutes and 2 seconds |
| Newspaper blank B (printed) | 2 minutes and 38 seconds |
| Newspaper A (5 g of rust inhibitor) | 17 minutes and 42 seconds |
| Newspaper B (10 g of rust inhibitor) | 17 minutes and 37 seconds |
| Filter paper blank | 6.7 seconds |
| Filter paper A (not dried) | 1 minute and 28 seconds |
| Filter paper B (dried) | 14 minutes and 46 seconds to 17 minutes |

It was clear from the above Table 3 that the rust inhibitor of the present invention also has water resistance.

Further, the rust inhibitor of the present invention has been already used for production of semiconductors, plant equipment, and auto parts in some companies. Specifically, a rust inhibitor of the present invention has been used in the Japanese Mint Bureau in Ikebukuro, Tokyo, for production of medals; in TOYOTA MOTOR CORP. and its Research and Development Center, HONDA MOTOR CO., LTD., NISSAN MOTOR CO., LTD., and SUZUKI MOTOR CORP. for production of auto parts; in Research and Development Center of TOSHIBA CORPORATION for production of semiconductors; in Nippon Steel Corporation for production of plant equipment; in TOPY INDUSTRIES, LTD. for production of caterpillar parts of a bulldozer; in Komatsu Manufacturing Co.,Ltd. for production of parts of a bulldozer; in AISIN SEIKI CO.,LTD. for production of auto parts; and in Machining Center of Ritsumeikan University for work studies in various fields. The rust inhibitor of the present invention has been also used during operation of machining centers, LC centers and specialized machining centers, and has been highly regarded for its rust resistance.

INDUSTRIAL APPLICABILITY

The rust inhibitor of the present invention can be added to a metal working fluid which is commonly used in metal working.

The rust inhibitor of the present invention does not adversely affect the environment and has as good rust resistance as amine rust inhibitor.

The rust inhibitor of the present invention can also be added to circulating fluid for radiator or air conditioner, and thus can be used for various cases where the prevention of formation of rust is required.

Furthermore, the rust inhibitor of the present invention is water repellent, so that it can also be used effectively as a waterproof agent.

What is claimed is:

1. A rust inhibitor comprising:
   saturated fatty acid;
   saturated dicarboxylic acid or salt thereof;
   chelating agent;
   tolyltriazole or benzotriazole;
   fatty acid metal salt; and
   water.

2. The rust inhibitor according to claim 1, which further comprises hydroxide and/or methasilicate.

3. The rust inhibitor according to claim 2, wherein said methasilicate is sodium methasilicate.

4. The rust inhibitor according to claim 1, wherein said saturated fatty acid is 0.1 to 5 wt %, said saturated dicarboxylic acid or salt thereof is 0.01 to 1 wt %, said chelating agent is 0.01 to 1 wt %, said tolyltriazole or benzotriazole in $5 \times 10^{-3}$ to 1 wt %, and said fatty acid metal salt is 0.01 to 1 wt %.

5. The rust inhibitor according to claim 1, wherein said saturated fatty acid is selected from the group consisting of caprylic acid, caproic acid, decanoic acid, lauric acid, myristic acid, palmitic acid, and stearic acid.

6. The rust inhibitor according to claim 1, wherein said saturated dicarboxylic acid or salt thereof is dodecanoic diacid or sebacic acid.

7. The rust inhibitor according to claim 1, wherein said chelating agent is a derivative of ethylenediamine tetraacetic acid or a derivative of nitrilotriacetic acid.

8. The rust inhibitor according to claim 1, wherein said fatty acid metal salt is fatty acid potassium salt.

* * * * *